Dec. 20, 1927.

F. FELDER 1,653,264

DEMOUNTABLE WHEEL

Filed April 14, 1927

Inventor
Franz Felder
By his Attorney

Patented Dec. 20, 1927.

1,653,264

UNITED STATES PATENT OFFICE.

FRANZ FELDER, OF NEW YORK, N. Y.

DEMOUNTABLE WHEEL.

Application filed April 14, 1927. Serial No. 183,707.

This invention relates to vehicle wheels and more particularly to mechanism associated with such wheels enabling removal of the wheels from their operative positions.

At the present time, devices of this sort are not efficient and require a great amount of manipulation, causing a waste of time and a great delay.

Should a motorist, for instance, puncture a tire, it is usually necessary to remove the rim, open the shoe and repair the tube, a disagreeable but necessary practice.

It is therefore the main object of this invention to provide means whereby inflated spare tires may be carried mounted on the wheels so that the interchanging, in the event of a "flat" or "blowout", may be quickly and easily accomplished.

A further aim is in the provision of a key actuated device rendering the wheel positively locked in place, yet readily removable if the occasion arises.

These and other objects, which will become apparent as the description progresses, are accomplished by the novel construction, combination and arrangement of parts, hereinafter described and illustrated in the accompanying drawing, forming a material portion of this disclosure, and in which:—

Figure 1:
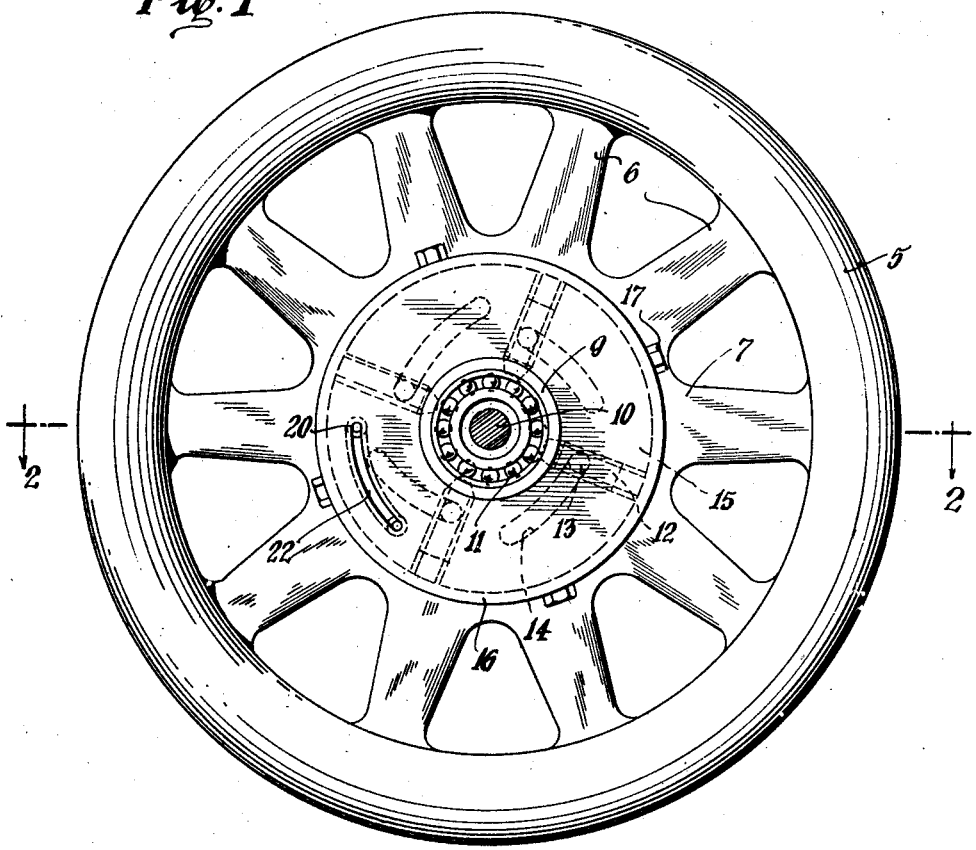
Figure 1 is a partial side elevational, partial transverse sectional view of a wheel embodying the features of this invention.
Figure 2:
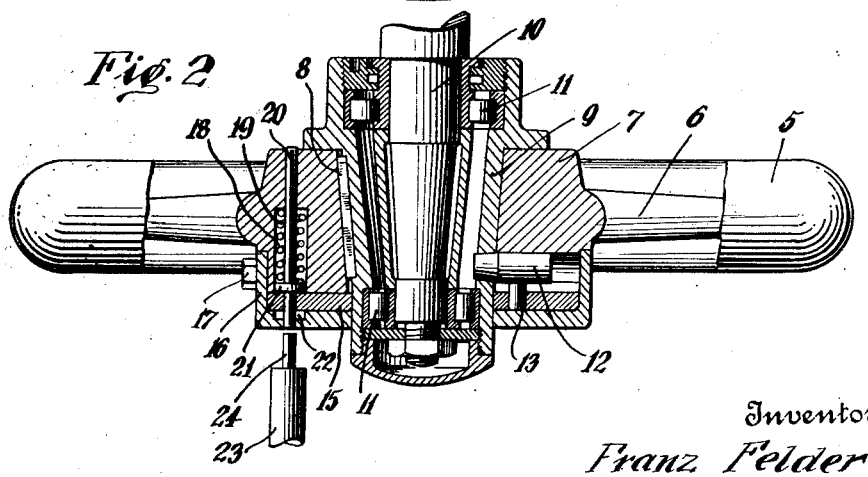
Figure 2 is a partial longitudinal sectional view taken on line 2—2 of Figure 1.

In the drawing, the numeral 5 designates a felly supported by spokes 6 radiating from a hub 7.

The hub is keyed at 8 on a sleeve 9 rotatably mounted on an axle 10, there being antifriction bearings 11 intermediate the sleeve and axle.

The hub is normally held fast to the sleeve by a plurality of pegs 12 radially slidable in the hub, the pegs being provided with right angled pins 13 engageable in slots 14, eccentric with the axle 10, formed in a disc 15 fast on the sleeve and held in place by a cap 16 secured to the hub by bolts 17.

Formed in the hub 7 is a recess 18 receptive of a spring 19 coiled about a rod 20 carrying a collar 21 normally abutting the disc 15, the rod extending through the disc and engaging a slot 22 in the cap 16.

A key 23 is provided with a stem 24 of the same diameter as the rod 20 and is used as will later be seen.

Thus, the pegs 12 are normally rigid in the sleeve 9 so that the wheel is held in its place.

Should it become necessary to remove the wheel, the stem 24 is engaged with the rod 20 to depress the same against the action of the spring 19.

When the rod is in such position the disc, obviously, may be turned so that, by engagement of the pins 13 and slots 14, the pegs 12 will slide outwardly, disengaging from the sleeve 9 and permitting the wheel to be slid from its anchorage.

To replace, the action is exactly reversed.

Although my invention has been described in detail, it is understood that changes may be made without departing from the spirit and scope of the appended claims.

Having thus described my invention, what I claim as new and desire to secure by Letters Patent, is:—

1. A demountable wheel comprising in combination with an axle and a sleeve rotatable thereon, of a plurality of pegs removably engageable between the hub of said wheel and the sleeve, and adjustable means for actuating said pegs to release said wheel.

2. A demountable wheel comprising in combination with an axle and a sleeve rotatable thereon, of a plurality of pegs removably engageable between the hub of said wheel and the sleeve, means to hold said pegs in their adjusted positions and a key to actuate said peg holding means.

In witness whereof I have affixed my signature.

FRANZ FELDER.